(12) United States Patent
Girnyk et al.

(10) Patent No.: US 10,541,735 B2
(45) Date of Patent: *Jan. 21, 2020

(54) BEAMFORMING USING AN ANTENNA ARRAY

(71) Applicant: Telefonaktiebolaget LM Ericsson (publ), Stockholm (SE)

(72) Inventors: Maksym Girnyk, Stockholm (SE); Sebastian Faxér, Järfälla (SE); Sven Petersson, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,520

(22) Filed: Jul. 31, 2018

(65) Prior Publication Data

US 2019/0013844 A1 Jan. 10, 2019

Related U.S. Application Data

(63) Continuation of application No. 15/101,276, filed as application No. PCT/SE2016/050118 on Feb. 16, 2016, now Pat. No. 10,164,694.

(30) Foreign Application Priority Data

Jan. 29, 2016 (WO) ................ PCT/SE2016/050061

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0634* (2013.01); *H04B 7/0639* (2013.01);
(Continued)

(58) Field of Classification Search
CPC .. H04B 7/2618; H04B 7/2643; H04B 7/2121; H04B 7/2123; H04W 72/0446;
(Continued)

(56) References Cited

U.S. PATENT DOCUMENTS

| 7,929,415 B2 | 4/2011 | Kwak |
| 2011/0164701 A1 | 7/2011 | Nikopourdellami |

(Continued)

FOREIGN PATENT DOCUMENTS

EP   2 484 026   8/2012

OTHER PUBLICATIONS

Hierarchical Codebook Design for Beamforming Training in Millimeter-Wave Communication by Zhenyu Xiao et al.; IEEE Transactions on Wireless Communications, vol. X, No. X, XXX.20XX—Jan. 18, 2016.

(Continued)

*Primary Examiner* — Dady Chery
(74) *Attorney, Agent, or Firm* — Baker Botts, LLP

(57) ABSTRACT

There is provided mechanisms for beamforming using an antenna array. A method is performed by a network node. The method comprises obtaining, from a wireless device, a precoding matrix indicator to be used for transmission to the wireless device. The method comprises selecting a codebook from a set of codebooks according to the received indicator, wherein the selected codebook defines the precoding matrix, and wherein the set of codebooks comprises codebooks defining variable beam widths and having same number of non-zero antenna weights for all beam widths. The method comprises precoding transmission of signals to the wireless device from the antenna array using the selected codebook.

6 Claims, 5 Drawing Sheets

(51) Int. Cl.
    *H04B 7/0413* (2017.01)
    *H04B 7/0452* (2017.01)
(52) U.S. Cl.
    CPC .......... *H04B 7/0413* (2013.01); *H04B 7/0452* (2013.01); *H04B 7/0617* (2013.01)
(58) Field of Classification Search
    CPC ..... H04W 72/04; H04W 72/12; H04W 76/00; H04J 3/1694; H04J 2203/0069; H04J 2011/0006; H04J 2203/0092; H03H 7/46; H04Q 5/12; H04Q 9/12; H04Q 2213/394
    See application file for complete search history.

(56) References Cited

U.S. PATENT DOCUMENTS

2013/0057432 A1    3/2013  Rajagopal et al.
2014/0105317 A1*   4/2014  Erell .................... H04B 7/0417
                                                          375/267

OTHER PUBLICATIONS

Millimeter Wave Beamforming for Wireless Backhaul and Access in Small Cell Networks by Sooyoung Hur et al.; IEEE Transactions on communications, vol. 61, No. 10—Oct. 2013.
PCT Notification of Transmittal of the International Search Report and the Written Op8inio of the International Searching Authority, Or the Declaration for International application No. PCT/SE2016/050118—dated Jan. 27, 2017.
EPO Communication Pursuant to Article 94(3) EPC issued for Application No. 16 709 832.6-1220—dated May 28, 2019.
3GPP TS 36.322 v13.0.0; Technical Specification; 3rd Generation Partnership Project; Technical Specification Group Radio Access Network; Evolved Universal Terrestrial Radio Access (E-UTRA); Radio Link Control (RLC) protocol specification (Release 13)—Dec. 2015.

* cited by examiner

BEAMFORMING USING AN ANTENNA ARRAY

PRIORITY

This application is a continuation of U.S. patent application Ser. No. 15/101,276 filed Jun. 2, 2016, entitled "Beamforming Using An Antenna Array" which is a U.S. National Stage Filing under 35 U.S.C. § 371 of International Patent Application Serial No. PCT/SE2016/050118, filed Feb. 16, 2016, and entitled "Beamforming Using An Antenna Array" which claims priority to International Patent Application Serial No. PCT/SE2016/050061 filed Jan. 29, 2016.

TECHNICAL FIELD

Embodiments presented herein relate to methods, a network node, a wireless device, computer programs, and a computer program product for beamforming using an antenna array. Embodiments presented herein further relate to methods, a network node, a wireless device, computer programs, and a computer program product for signaling a precoding matrix indicator of an antenna array.

BACKGROUND

In communications networks, there may be a challenge to obtain good performance and capacity for a given communications protocol, its parameters and the physical environment in which the communications network is deployed.

For example, multi-antenna techniques can potentially increase the performance in terms of data rates and reliability of a wireless communications network. The performance can, in particular, be improved if both the transmitting device and the receiving device are equipped with multiple antennas, which results in a multiple-input multiple-output (MIMO) communication channel. Such networks and/or related techniques are commonly referred to as MIMO.

The Long Term Evolution (LTE) standard is currently evolving to support MIMO, such as MIMO antenna deployments and MIMO related techniques. Currently, the so-called LTE-Advanced standard supports an 8-layer spatial multiplexing mode for 8 transmitting antennas with channel dependent precoding. The spatial multiplexing mode is aimed for high data rates in favorable channel conditions. An illustration of the spatial multiplexing operation is provided in FIG. 2. FIG. 2 schematically illustrates a network node 150 comprising an example transmission structure for the precoded spatial multiplexing mode in LTE. As seen in FIG. 2, an information carrying symbol vector s from r input layers (denoted Layer 1, Layer 2, . . . Layer r) is multiplied by an $N_T$ times r precoder matrix W. This precoder matrix serves to distribute the transmit energy in a subspace of the $N_T$ dimensional vector space (corresponding to $N_T$ antenna ports), where the thus precoded symbol vector is fed to inverse Fast Fourier Transformers before being fed to the antenna ports and then to an antenna array of a radio access network node. The precoder matrix is typically selected from a codebook of possible precoder matrices, and typically indicated by means of a precoder matrix indicator (PMI). The PMI specifies a unique precoder matrix in the codebook for a given number of symbol streams. The r symbols in s each correspond to a layer and r is referred to as the transmission rank. In this way, spatial multiplexing is achieved since multiple symbols can be simultaneously transmitted over the same time/frequency resource element (TFRE). The number of symbols r is typically adapted to suit the current channel properties.

In the LTE standard, orthogonal frequency-division multiplexing (OFDM) is used in the downlink (i.e. for transmission from radio access network nodes to wireless devices served by the network) and Discrete Fourier Transform (DFT) precoded OFDM is used in the uplink (i.e. for transmission to radio access network nodes from wireless devices served by the network) and hence the received $N_R \times 1$ vector $y_n$ for a certain TFRE on a subcarrier n (or alternatively data TFRE number n) is modeled by $$y_n = H_n W s_n + n_n \qquad \text{Equation 1}$$

where $n_n$ is a noise/interference vector obtained as realizations of a random process. The precoder W can be a wideband precoder which is constant over frequency, or a frequency selective precoder.

The precoder matrix W can be chosen to match the characteristics of the $N_R \times N_T$ dimensional MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to one of the served wireless devices. In addition, the precoder matrix may also be selected to strive for orthogonalizing the channel, meaning that after proper linear equalization at the served wireless device, the inter-layer interference is reduced.

However, there is still a need for improved mechanisms for flexible selection of precoder matrix.

SUMMARY

An object of embodiments herein is to provide mechanisms for flexible selection of a precoder matrix.

According to a first aspect there is presented a method for beamforming using an antenna array. The method is performed by a network node. The method comprises obtaining, from a wireless device, a precoding matrix indicator to be used for transmission to the wireless device. The method comprises selecting a codebook from a set of codebooks according to the received indicator, wherein the selected codebook defines the precoding matrix, and wherein the set of codebooks comprises codebooks defining variable beam widths and having same number of non-zero antenna weights for all beam widths. The method comprises precoding transmission of signals to the wireless device from the antenna array using the selected codebook.

According to a second aspect there is presented a network node for beamforming using an antenna array. The network node comprises processing circuitry and a storage medium. The storage medium stores instructions that, when executed by the processing circuitry, causes the network node to perform a set of operations, or steps. The operations, or steps, cause the network node to obtain, from a wireless device, a precoding matrix indicator to be used for transmission to the wireless device. The operations, or steps, cause the network node to select a codebook from a set of codebooks according to the received indicator, wherein the selected codebook defines the precoding matrix, and wherein the set of codebooks comprises codebooks defining variable beam widths and having same number of non-zero antenna weights for all beam widths. The operations, or steps, cause the network node to precode transmission of signals to the wireless device from the antenna array using the selected codebook.

According to a third aspect there is presented a network node for beamforming using an antenna array. The network node comprises an obtain module configured to obtain, from a wireless device, a precoding matrix indicator to be used for transmission to the wireless device. The network node comprises a select module configured to select a codebook from a set of codebooks according to the received indicator, wherein the selected codebook defines the precoding matrix, and wherein the set of codebooks comprises codebooks defining variable beam widths and having same number of non-zero antenna weights for all beam widths. The network node comprises a precode module configured to precode transmission of signals to the wireless device from the antenna array using the selected codebook.

According to a fourth aspect there is presented a computer program for beamforming using an antenna array, the computer program comprising computer program code which, when run on processing circuitry of a network node, causes the network node to perform a method according to the first aspect.

According to a fifth aspect there is presented a method for enabling beamforming using an antenna array. The method is performed by a wireless device. The method comprises obtaining channel measurements on reference signals received from the antenna array to form channel estimates. The method comprises selecting, using the channel estimates, a precoding matrix indicator from a set of codebooks, wherein the set of codebooks comprises codebooks defining variable beam widths and having same number of non-zero antenna weights for each beam width. The method comprises transmitting the precoding matrix indicator to a network node. The method comprises receiving transmission of signals from the antenna array, the transmission signals having been precoded with a selected codebook, wherein the selected codebook defines the precoding matrix.

According to a sixth aspect there is presented a wireless device for enabling beamforming using an antenna array. The wireless device comprises processing circuitry and a storage medium. The storage medium stores instructions that, when executed by the processing circuitry, causes the wireless device to perform a set of operations, or steps, operations, or steps, cause the wireless device to obtain channel measurements on reference signals received from the antenna array to form channel estimates. The operations, or steps, cause the wireless device to select, using the channel estimates, a precoding matrix indicator from a set of codebooks, wherein the set of codebooks comprises codebooks defining variable beam widths and having same number of non-zero antenna weights for each beam width. The operations, or steps, cause the wireless device to transmit the precoding matrix indicator to a network node. The operations, or steps, cause the wireless device to receive transmission of signals from the antenna array, the transmission signals having been precoded with a selected codebook, wherein the selected codebook defines the precoding matrix.

According to a seventh aspect there is presented a wireless device for enabling beamforming using an antenna array. The wireless device comprises a channel measurement module configured to obtain channel measurements on reference signals received from the antenna array to form channel estimates. The wireless device comprises a select module configured to select, using the channel estimates, a precoding matrix indicator from a set of codebooks, wherein the set of codebooks comprises codebooks defining variable beam widths and having same number of non-zero antenna weights for each beam width. The wireless device comprises a transmit module configured to transmit the precoding matrix indicator to a network node. The wireless device comprises a receive module configured to receive transmission of signals from the antenna array, the transmission signals having been precoded with a selected codebook, wherein the selected codebook defines the precoding matrix.

According to an eight aspect there is presented a computer program for enabling beamforming using an antenna array, the computer program comprising computer program code which, when run on processing circuitry of a wireless device, causes the wireless device to perform a method according to the fifth aspect.

Advantageously these methods, these network nodes, these wireless devices, and these computer programs enables efficient beamforming to be used by an antenna array. In turn, this enables flexible selection of precoder matrix.

Further advantages of these methods, these network nodes, these wireless devices, and these computer programs will now be disclosed.

Advantageously, efficient adaptability to channel conditions is enabled without significantly increasing the amount of required feedback signaling from the wireless device to the network node. Specific advantages of allowing the wireless device to dynamically, in a closed-loop fashion, change the beam width of the beam used for downlink transmission will now be disclosed.

Increased robustness for time-varying channels is achieved. For a wireless device with a channel with large angular spread, beamforming with a narrow beam may not lead to an increase in received signal power compared to beamforming with a broader beam due to that the channel energy is distributed in several angular directions. In fact, focusing the signal energy at a single multi-path component may lead to decreased robustness, as the multi-path component could experience a fading dip. This is especially true for cases with high Doppler or long CSI-RS periodicities. Beamforming with a broad beam could thus result in a diversity gain.

Increased robustness against channel estimation errors is achieved. For a wireless device with a poor estimation of the signal to interference plus noise ratio (SINR) the resulting channel estimate can be of low quality. Selecting a precoder based on such a channel estimate may thus be error-prone. If the precoder corresponds to a narrow beam, selecting the incorrect precoder might result in the wireless device not being covered by the beam, thus resulting in packet loss. In such a case, it can be beneficial to instead select a broader beam.

A reduction of flashlight interference in the communications network is achieved. In a communications network using beam forming with narrow beams, the inter-cell interference level can vary rapidly over time. The interference level measured by the wireless device at the time of CSI reporting may be substantially different at the time of data transmission. This may lead to link adaptation errors which have a detrimental effect on system performance. This phenomenon, often called the "flashlight effect", gets worse the narrower beams are used for transmission in the communications network. The gains in system performance when narrowing the beamwidth (from increased beamforming gain) is thus offset by the increase in flashlight interference. According to the herein disclosed embodiments, a mixture of broad and narrow beams are allowed to be used in the communications network, reducing the so called flashlight effect and thus leading to improved system performance. Since switching from a narrow beam to a broader beam will not reduce the received power for wireless device with channels with large angular spread, this will result in an increase in system performance.

Improved co-scheduling for multi user MIMO (denoted MU-MIMO) is achieved. In MU-MIMO, data is transmitted to two or more wireless devices simultaneously. For MU-MIMO transmission to be beneficial, the channels of the co-scheduled wireless devices should be orthogonal and non-overlapping in the angular domain. The radio access network node usually makes a co-scheduling decision based on the precoders reported by the wireless devices, if a first wireless device reports a precoder corresponding to a narrow beam, but has a channel with large angular spread, the radio access network node may make a non-optimal co-scheduling decision and co-schedule the first wireless device with a second wireless device which has an overlapping channel with the first wireless device. This would then result in the first wireless device receiving a high level of interference. If instead the first wireless device reported a precoder corresponding to a broader beam, the angular spread would have been captured in the precoder selection and a more proper co-scheduling decision could have been made.

The number of active antenna elements (i.e., antenna elements to which non-zero antenna weights are applied) are kept constant, resulting in good power utilization of the antenna array whilst avoiding issues with coverage and loss in received power.

According to a ninth aspect there is presented a method for signaling a precoding matrix indicator of an antenna array. The method is performed by a network node. The method comprises obtaining, from a wireless device, a precoding matrix indicator to be used for transmission to the wireless device, wherein the precoding matrix indicator independently defines a direction parameter and a beam width parameter of the precoding matrix. The method comprises selecting a codebook from a set of codebooks according to the received indicator. The method comprises precoding transmission of signals to the wireless device from the antenna array using the selected codebook.

According to a tenth aspect there is presented a network node for signaling a precoding matrix indicator of an antenna array. The network node comprises processing circuitry and a storage medium. The storage medium stores instructions that, when executed by the processing circuitry, causes the network node to perform a set of operations, or steps. The operations, or steps, cause the network node to obtain, from a wireless device, a precoding matrix indicator to be used for transmission to the wireless device, wherein the precoding matrix indicator independently defines a direction parameter and a beam width parameter of the precoding matrix. The operations, or steps, cause the network node to select a codebook from a set of codebooks according to the received indicator. The operations, or steps, cause the network node to precode transmission of signals to the wireless device from the antenna array using the selected codebook.

According to an eleventh aspect there is presented a network node for signaling a precoding matrix indicator of an antenna array. The network node comprises an obtain module configured to obtain, from a wireless device, a precoding matrix indicator to be used for transmission to the wireless device, wherein the precoding matrix indicator independently defines a direction parameter and a beam width parameter of the precoding matrix. The network node comprises a select module configured to select a codebook from a set of codebooks according to the received indicator. The network node comprises a precode module configured to precode transmission of signals to the wireless device from the antenna array using the selected codebook.

According to a twelfth aspect there is presented a computer program for signaling a precoding matrix indicator of an antenna array, the computer program comprising computer program code which, when run on processing circuitry of a network node, causes the network node to perform a method according to the ninth aspect.

According to a thirteenth aspect there is presented a method for signaling a precoding matrix indicator of an antenna array. The method is performed by a wireless device. The method comprises obtaining channel measurements on reference signals received from the antenna array to form channel estimates. The method comprises selecting, using the channel estimates, a precoding matrix indicator to be used for transmission to the wireless device, wherein the precoding matrix indicator independently defines a direction parameter and a beam width parameter of the precoding matrix. The method comprises transmitting the precoding matrix indicator to a network node. The method comprises receiving to transmission of signals from the antenna array, the transmission signals having been precoded with a selected codebook, the selected codebook being selected according to the precoding matrix indicator.

According to a fourteenth aspect there is presented a wireless device for signaling a precoding matrix indicator of an antenna array. The wireless device comprises processing circuitry and a storage medium. The storage medium stores instructions that, when executed by the processing circuitry, causes the wireless device to perform a set of operations, or steps. The operations, or steps, cause the wireless device to perform channel measurements on reference signals received from the antenna array to form channel estimates. The operations, or steps, cause the wireless device to select, using the channel estimates, a precoding matrix indicator to be used for transmission to the wireless device, wherein the precoding matrix indicator independently defines a direction parameter and a beam width parameter of the precoding matrix. The operations, or steps, cause the wireless device to transmit the precoding matrix indicator to a network node. The operations, or steps, cause the wireless device to receive transmission of signals from the antenna array, the transmission signals having been precoded with a selected codebook, the selected codebook being selected according to the precoding matrix indicator.

According to a fifteenth aspect there is presented a wireless device for signaling a precoding matrix indicator of an antenna array. The wireless device comprises a channel measurement module configured to perform channel measurements on reference signals received from the antenna array to form channel estimates. The wireless device comprises a select module configured to select, using the channel estimates, a precoding matrix indicator to be used for transmission to the wireless device, wherein the precoding matrix indicator independently defines a direction parameter and a beam width parameter of the precoding matrix. The wireless device comprises a transmit module configured to transmit the precoding matrix indicator to a network node. The wireless device comprises a receive module configured to receive transmission of signals from the antenna array, the transmission signals having been precoded with a selected codebook, the selected codebook being selected according to the precoding matrix indicator.

According to a sixteenth aspect there is presented a computer program for signaling a precoding matrix indicator of an antenna array, the computer program comprising computer program code which, when run on processing circuitry of a wireless device, causes the wireless device to perform a method according to the thirteenth aspect.

According to a seventeenth aspect there is presented a computer program product comprising a computer program according to at least one of the fourth aspect, the eight aspect, the twelfth aspect, and the sixteenth aspect and a computer readable storage medium on which the computer program is stored. The computer readable storage medium can be a non-transitory computer readable storage medium.

It is to be noted that any feature of the first, second, third, fourth, fifth, sixth seventh, eighth, ninth, tenth, eleventh, twelfth, thirteenth, fourteenth, fifteenth, sixteenth and seventeenth aspects may be applied to any other aspect, wherever appropriate. Likewise, any advantage of the first aspect may equally apply to the second, third, fourth, fifth, sixth, seventh, eighth, ninth, tenth, eleventh, twelfth, thirteenth, fourteenth, fifteenth, sixteenth, and/or seventeenth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
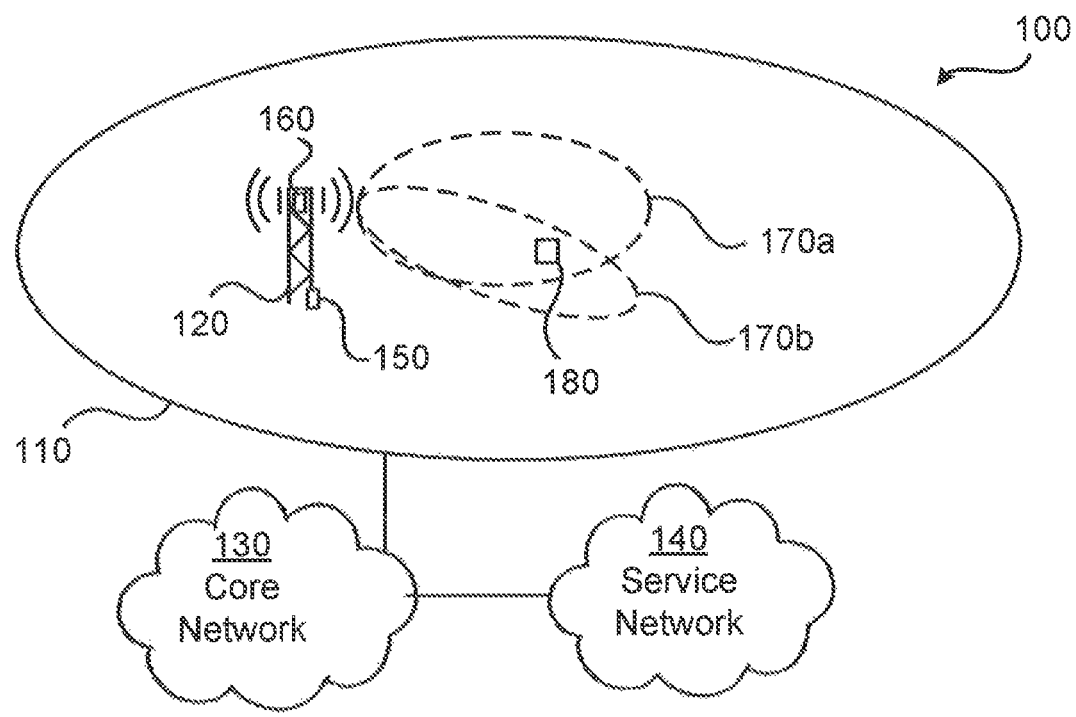
FIG. 1 is a schematic diagram illustrating a communication network according to embodiments.
Figure 2:
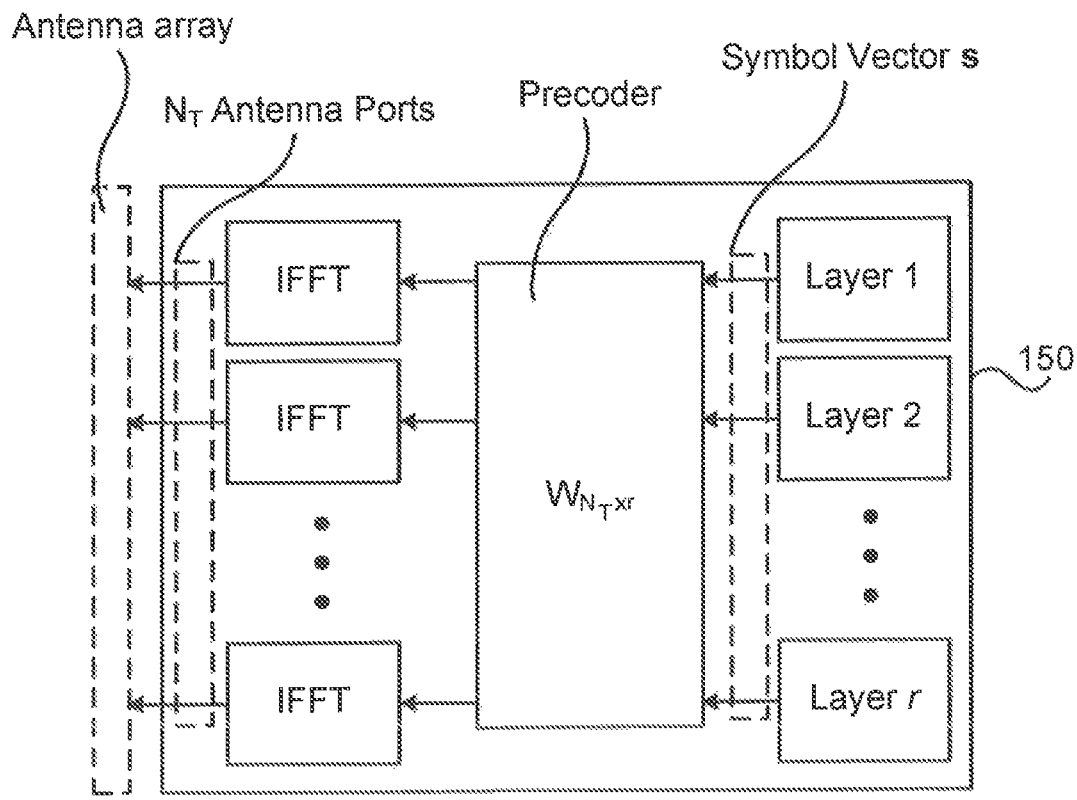
FIG. 2 is a schematic diagram showing transmission structure of precoded spatial multiplexing mode in a network node.

FIG. 1 is a schematic diagram illustrating a communications network 100 where embodiments presented herein can be applied. The communications network 100 comprises a radio access network 110, a core network 130, and a service network 140. The radio access network 110 is operatively connected to the core network 130, which in turn is operatively connected to the service network 140. The radio access network 110 comprises at least one radio access network node 120. Each radio access network node 120 comprises an antenna array 160. Each radio access network node 120 can be provided as a radio base station, a base transceiver station, a Node B, an evolved Node B, or an Access Point. The at least one radio access network node 120 provides network access for at least one wireless devices 180. Each wireless device 180 can be a portable wireless device, a mobile station, a mobile phone, a handset, a wireless local loop phone, a user equipment (UE), a smartphone, a laptop computer, a tablet computer, a sensor device, or a wireless modem.

The communications network 100 further composes at least one network node 150. The at least one network node 150 may be co-located with the radio access network node 120. Further details of the network node 150 and its functionality will be disclosed below.

It is assumed that the radio access network node 120 provides network access for the wireless device 180 by transmitting signals in one of at least two transmission beams 170a, 170b. Each such transmission beam 170a, 170b is assumed to correspond to a precoder matrix. One example method for a wireless device 180 to select a precoder matrix W is for the wireless device 180 to select the precoder matrix $W_k$ in a set of K available precoder matrices that maximizes the Frobenius norm of the hypothesized equivalent channel:

$$\max_k \|\hat{H}_n W_k\|_F^2 \qquad \text{Equation 2}$$

Here, $\hat{H}_n$ is a channel estimate, possibly derived from Channel State Information Reference Signals (CSI-RS) as described below; $W_k$ is a hypothesized precoder matrix with index k, and $\hat{H}_n W_k$ is the hypothesized equivalent channel.

In closed-loop precoding as used in the downlink according to the LTE standard, the wireless device 180 transmits, based on channel measurements in the forward link (downlink), recommendations to the network node 150 of a suitable precoder to use. The network node 150 configures the wireless device 180 to provide feedback according to the transmission mode used by the wireless device 180. The network node 150 can transmit CSI-RS and configure the wireless device 180 to use measurements of CSI-RS to feed back recommended precoding matrices that the wireless device 180 selects from a codebook. A single precoder that is supposed to cover a large bandwidth (wideband precoding) may be fed back to the network node 150 from the wireless device 180. According to aspects the frequency variations of the channel are mapped and instead the wireless device feeds back a frequency-selective precoding report, e.g. identifying several precoders, one per subband.

This is an example of the more general case of channel state information (CSI) feedback, which also encompasses feeding back other information than recommended precoders to assist the network node 150 in subsequent transmissions to the wireless device 180. Such other information can include channel quality indicators (CQIs) as well as transmission rank indicator (RI).

Given the CSI feedback from the wireless device 180, the network node 150 determines the transmission parameters, such as the precoding matrix, transmission rank, and modulation and coding state (MCS), it is to use during transmission of signals to the wireless device 180. These transmission parameters may differ from the recommendations the wireless device 180 makes. Therefore, the rank indicator and MCS can be signaled in downlink control information (DCI), and the precoding matrix can be signaled in the DCI. Alternatively the network node 150 can transmit a demodulation reference signal from which the equivalent channel can be measured. The transmission rank, and thus the number of spatially multiplexed layers, is reflected in the number of columns of the precoder W. For efficient performance, a transmission rank that matches the channel properties can be selected.

The wireless device 180 can be configured to, by measuring a CSI-RS transmitted from the network node 150, estimate the effective channel the CSI-RS is traversing, including the radio propagation channel and antenna gains. This implies that if a known CSI-RS signal x is transmitted, the wireless device 180 can estimate the coupling between the transmitted signal and the received signal, i.e., the effective channel H. Hence if no virtualization is performed in the transmission, the received signal y can be expressed as $$y = Hx + n \quad \text{Equation 3}$$

The wireless device 180 can thereby estimate the effective channel H.

Up to eight CSI-RS ports can be configured in LTE Release-10. That is, the UE can estimate the channel from up to eight transmit antennas.

Based on a specified CSI-RS resource and on an interference measurement configuration, the wireless device 180 can estimate the effective channel and noise plus interference, and consequently also determine the rank, precoding matrix, and MCS to recommend to best match the particular channel.

In LTE Release-10, for eight antenna ports, a factorized precoder structure for the precoder W is used; namely $W = W_1 W_2$. The first precoder, denoted $W_1$, is a wideband precoder targeting long term channel characteristics. The second precoder, denoted $W_2$, is a frequency-selective precoder targeting short term channel characteristics and/or difference in polarization.

A precoder matrix indicator (PMI) for each of the two precoders is supplied by the wireless device 180 selecting each precoder from a limited set of available precoders (codebooks). The PMI reporting for each of the two precoders can be configured with different frequency granularity.

The LTE standard implements a variation of the following factorized precoder. The wideband precoder $$W_1 = \begin{bmatrix} X & 0 \\ 0 & X \end{bmatrix}$$

has a block diagonal structure targeting a uniform linear array (ULA) of N cross-polarized antennas (i.e. the number of antenna ports $N_T = 2N$). With this structure, the same N×1 precoder X is applied to each of the two polarizations.

The precoder X is a Discrete Fourier Transform (DFT) based precoder, implementing a Grid-of-Beams codebook, supplying the wireless device 180 with beams pointing at different directions to choose from during its selection of precoder. The DFT-based codebook has entries $$X^k = \begin{bmatrix} 1 & e^{j2\pi \frac{k}{NQ}} & \ldots & e^{j2\pi \frac{(N-1)k}{NQ}} \end{bmatrix}^T,$$

k=0, . . . , NQ−1, where Q is an integer oversampling factor, defining the number of beams.

A DFT-based precoder as described above will focus the signal energy at a single angular direction. The DFT-based precoders are tailored to a ULA with a specific number of antenna ports. A separate codebook for each number of supported antenna ports $N_T$ could then be specified.

The frequency-selective precoder for rank 1 is defined as $$W_2 = \begin{bmatrix} 1 \\ e^{j\omega} \end{bmatrix}, \text{ where } \omega = \frac{2\pi p}{P}$$

p=0, . . . , P−1 and P=4 is the phase shift between the polarizations.

The resulting precoder thus becomes $$W = W_1 W_2 = \begin{bmatrix} X & 0 \\ 0 & X \end{bmatrix} \begin{bmatrix} 1 \\ e^{j\omega} \end{bmatrix} = \begin{bmatrix} X \\ e^{j\omega} X \end{bmatrix}. \quad \text{Equation 4}$$

For rank 2, the frequency-selective precoder may be similarly defined as $$W_2 = \begin{bmatrix} 1 & 1 \\ e^{j\omega} & -e^{j\omega} \end{bmatrix}.$$

In order for the two transmitted layers to be orthogonal, the matrix $W_2$ should be an orthogonal matrix, i.e., the matrix product $W_2 W_2^H$ should be a scaled identity matrix.

Codebooks constructed using DFT-vectors enable beamforming towards a fixed set of angular directions. A DFT beam, by its nature, is characterized with a fixed radiation pattern, whose half power beamwidth (HPBW) is determined by the parameters of the antenna array 160, such as the number of antennas, antenna element spacing, and HPBW of the radiation pattern of an antenna element. For example, an antenna array 160 having eight equidistant omnidirectional antennas with a nearest-neighbor spacing of 0.8 wavelengths, excited with a DFT vector will yield a radiation pattern with a HPBW of 8 degrees.

Generally, the radiation pattern of a DFT-beam pointing at the angle $\phi_0$ transmitted from a ULA having N antennas can be described by the Dirichlet kernel $|G(\theta)|$ as follows:

$$|G(\theta)| = \left| \frac{\sin[N\pi d_\lambda(\sin\phi - \sin\phi_0)]}{\sin[\pi d_\lambda(\sin\phi - \sin\phi_0)]} \right|.$$

Figure 3:
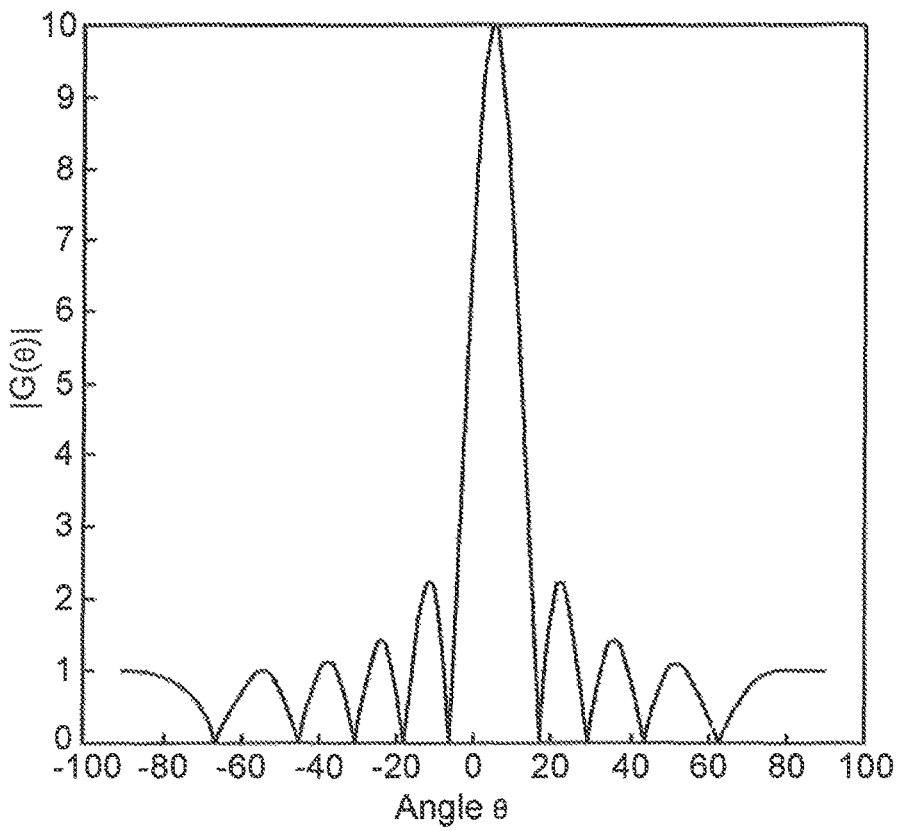
FIG. 3 illustrates the radiation pattern of a transmission beam.

As follows from the above expression for |G(θ)|, as the number or antennas N in the ULA increases, the radiation pattern becomes more and more narrow and increases the antenna gain at $\phi=\phi_0$. Actually, as N→∞ the Dirichlet kernel approaches a Dirac delta function with infinitely small beamwidth and infinite antenna gain a $\phi=\phi_0$. FIG. 3 illustrates the radiation pattern in terms of |G(θ)| as a function of angle θ for a DFT-beam with N=10, $\phi_0=5°$.

The use of beamforming to focus the radiated energy (defining the transmitted signals) at single angular direction is beneficial if the wireless channel mainly consists of a strong single resolvable path, such as a strong Line-of-Sight (LoS) path. However, a wireless channel generally comprises many multi-path components, where the multi-path components may lie at different angular directions. In many cases, a wireless device 180 may be physically located where it lacks a strong LoS-path, thus resulting in a non-Line-of-Sight propagation condition, and many of the multipath-components can be equally strong. In such as case, beamforming with a more narrow beam and focus of the energy at a single direction may not result in any performance gains because although the antenna gain in that direction is increased a large portion of the channel energy is missed.

Generally a measure of the angular spread of the wireless channel can be determined from the weighted sum of the deviation of the angle $\phi_i$ for each multi-path component from the average channel angle $\bar\phi$, weighting the sum by the power $p_i$ of the multi-path component as follows:

$$AS_{RMS} = \sqrt{\frac{\sum_i p_i \cdot e^{j(\phi_i - \bar\phi)}}{\sum_i p_i}}$$

Here, $AS_{RMS}$ denotes the root mean square of the angular spread. The larger the angular spread of the channel, the less additional benefit is had by beamforming with a narrow beam compared to beamforming with a broader beam.

Thus, the wider the antenna array 160, the narrower the main beam. Hence, one embodiment to achieve a broader radiation pattern is to only use part of the antenna array 160 instead of using all the available antenna elements. As an example, the antenna array 160 could be iteratively divided in half. After each division, every such obtained half of the array (denoted a subarray) will have a broader radiation pattern. Then, an aforementioned sub-codebook could be designed for the subarray, containing matrices W(l,k) for k∈{1, . . . , K} which have a structure similar to that in Equation 4, namely a DFT-vector precoder of an appropriate length is applied to a given subarray.

For example, for an antenna array 160 with N=8 cross-polarized antenna elements, there are $L+1=\log_2(8)+1=4$ levels in the main codebook, where the sub-codebooks are designed for subarrays of lengths $n_1=1$, $n_2=2$, $n_3=4$ and $n_4=8$. These sub-codebooks can, for example, be constructed using existing LTE Release-8 and Release-10 codebooks.

Unfortunately, direct utilization of this approach (i.e., activating a subarray, whilst muting the rest of antennas) would result in poor power utilization of the antenna array 160. Due to constraints on per-antenna power, the total amount of utilized power will be reduced, leading to, e.g., issues with coverage and loss in received power. To resolve this issue, embodiments that will disclosed next propose a codebook that exploits a dual-polarized antenna design, which enables dual-polarized beamforming.

The embodiments disclosed herein thus generally relate to mechanisms for beamforming using an antenna array 160. In order to obtain such mechanisms there is provided a network node 150, a method performed by the network node 150, a computer program product comprising code, for example in the form of a computer program, that when run on processing circuitry of the network node 150, causes the network node 150 to perform the method. In order to enabling beamforming using an antenna array 160 there is provided a wireless device 180, a method performed by the wireless device 180, and a computer program product comprising code, for example in the form of a computer program, that when run on processing circuitry of the wireless device 180, causes the wireless device 180 to perform the method.

In general terms, according to at least some embodiments disclosed herein a codebook for closed-loop CSI feedback, parametrized not only with pointing directions but also with HPBWs of the beams, is proposed. Various beamwidths are obtained, without loss in power utilization. In this way, a traditional LTE codebook can be extended in one or two dimensions, incorporating also HPBWs in azimuth and elevation domains. As a result thereof, a wireless device 180 is enabled to select a precoder representing a beam having not only a suitable pointing direction, but also having a suitable beamwidth.

In general terms at least some of the embodiments disclosed herein provide a procedure for constructing a set of codebooks corresponding to different beamwidths by starting with a DFT-codebook corresponding to a smaller number of antenna ports than the number of antenna ports used for data transmission, and iteratively increasing the length of the precoders by applying a fixed update step.

Figure 4:
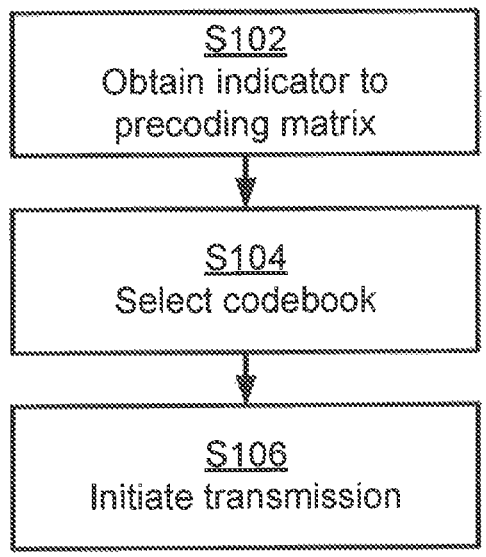
FIGS. 4, 5a, 5b, 6, and 7, are flowcharts of methods according to embodiments.
Figure 5A:
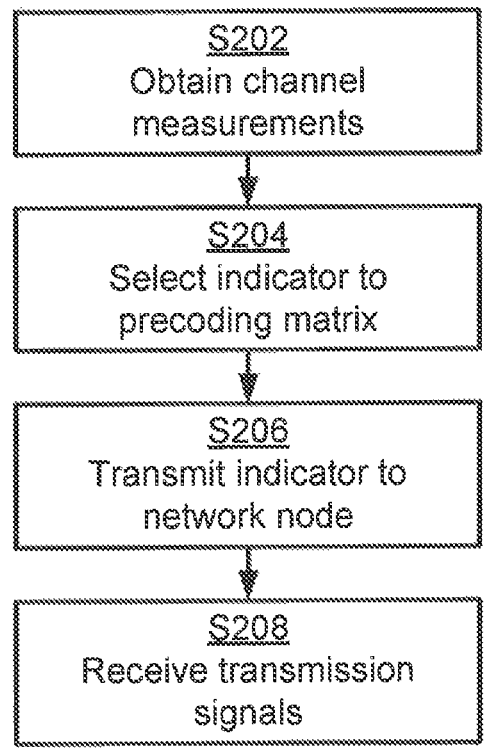
Figure 5B:
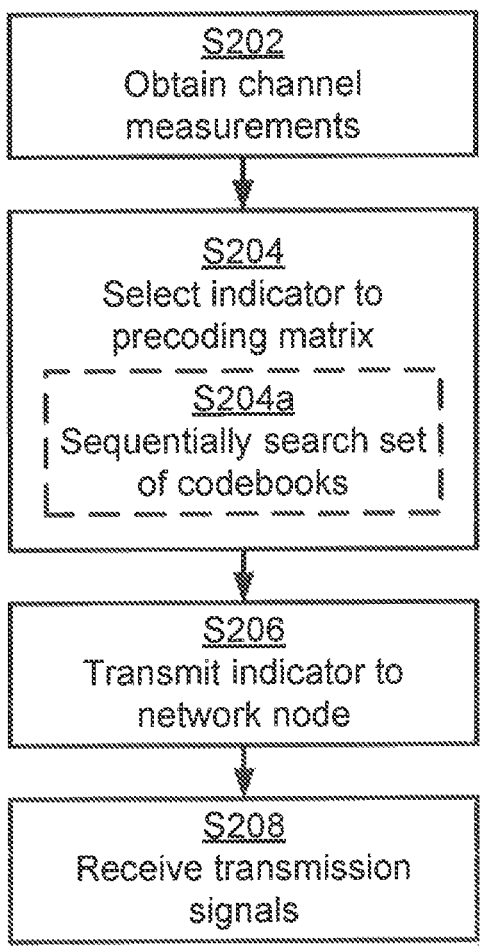

FIG. 4 is a flow chart illustrating embodiments of a method for beamforming using an antenna array 160 as performed by the network node 150. FIGS. 5a and 5b are flow charts illustrating embodiments of methods for enabling beamforming using an antenna array 160 as performed by the wireless device 180. The methods are advantageously provided as computer programs 1120a, 1120b, 1120c, 1120d.

Reference is now made to FIG. 4 illustrating a method for beamforming using an antenna array 160 as performed by the network node 150 according to an embodiment.

For illustrative purposes, it can be assumed that the wireless device 180 has performed channel measurements on reference signals as transmitted by the antenna array 160 of the radio access network node 120 in order for the wireless device 180 to form channel estimates and that the wireless device 180 has selected a precoding matrix indicator using the channel estimates. The network node 150 is therefore configured to obtain the precoding matrix indicator as in step S102:

S102: The network node 150 obtains, from the wireless device 180, the precoding matrix indicator. The precoding matrix is to be used for transmission from the network node 150 (by means of the radio access network node 120) to the wireless device 180.

The network node 150 then selects a codebook based on the received indicator. Hence, the network node 150 is configured to perform step S104:

S104: The network node 150 selects a codebook from a set of codebooks according to the received indicator. The selected codebook defines the precoding matrix. The set of codebooks comprises codebooks defining variable beam widths and having the same number of non-zero antenna weights for all beam widths. Here, non-zero is to be interpreted as non-zero magnitude; the phase of the antenna weights could be zero. In this respect, this does not require actually exciting each and all antenna elements; a signal could occasionally be zero but the corresponding antenna element is not deactivated as such. Details of how to form such a set of codebooks will be disclosed below. In this respect, instead of defining a set of codebooks, one for each beam width, a single codebook comprising precoder matrices with different beam widths can correspondingly be defined. However, to keep the notation simple, it will hereinafter be assumed that set of codebooks is defined. In general terms, antenna weights are used in the antenna array 160 for controlling the transmission behavior of the antenna array 160, namely what beam forms (such as beam widths, beam directions, beam power) that are transmitted from the antenna array 160.

Once the codebook has been selected the network node 150 can use it for precoding. Hence, the network node 150 is configured to perform step S106:

S106: The network node 150 precodes transmission of signals to the wireless device 180 from the antenna array 160 using the selected codebook.

Embodiments relating to further details of beamforming using an antenna array 160 as performed by the network node 150 will now be disclosed.

There may be different ways to form the set of codebooks. Different embodiments relating thereto will now be described in turn.

According to an embodiment the set of codebooks comprises extension codebooks. All extension codebooks are then derivable from respective initial codebooks.

Examples of initial codebooks, extension codebooks, and how the extension codebooks can be derivable from the initial codebooks will be disclosed below.

For example, assume that precoder vectors of the initial codebooks have respective spatial frequency response patterns. According to some aspects, all extension codebooks are then derivable from the respective initial codebooks such that precoder vectors of each extension codebook preserve the respective spatial frequency response pattern.

According to an embodiment, each extension codebook is iteratively derivable from the respective initial codebook. In order to iteratively derive each extension codebook from the respective initial codebook at least some of the following operations are applied to the initial codebook. For example, elements of the respective codebook can be duplicated; at least some of the elements of the respective codebook that are being duplicated can be reversed in order; at least some of the elements of the respective codebook that are being duplicated can be (complex-)conjugated, and at least some of the elements of the respective codebook that are being duplicated can have their weights negated. Furthermore, the duplicated elements—after optionally having been reversed and/or conjugated and/or negated—may be added to corresponding elements of the previous iteration. In this respect, those elements that have their weights negated are phase shifted 180 degrees such that there is a phase shift of 180 degrees between any two components feeding associated elements with opposite polarizations of the antenna array 160. In this respect, a number of operations that preserve the desired property can be performed, such as reversal of both per-polarization weight vectors, interchange of the weight vectors between the polarizations, conjugate-reversal of any of the per-polarization vectors, constant phase offset applied to any of the per-polarization weights, incremental phase offset applied to individual weights (same for both polarizations), padding zeros to any of the per-polarization vectors (this destroys the power-utilization efficiency, but keeps the beam wide), small phase perturbations applied to the weights (this destroys the desired spatially-flat-power-spectrum property, but can still produce an almost wide beam). In terms of almost wide beam is meant that the resulting beam is almost as wide as the beam of a single sub-element (if this is the aim), and alternatively, the beam can have almost the same radiation pattern as the pattern of the underlying subarray which is to be preserve (if this is the aim). For example, if the aim is for an antenna array 160 with 8-by-1 antenna elements to preserve the DFT beam shape of an antenna array 160 with 4-by-1 antenna elements, these perturbations will yield a beam shape that is close to that of the 4-by-1 antenna array 160. Although having some ripples/distortions, this might be practically acceptable. At least some of these operations can be applied also to weights from which the total weight vectors are derived.

Assume that there are L extension codebooks, $W=\{W(0), \ldots, W(L)\}$. Then, according to an embodiment, $L=\log_2 N$ represents the number of available extension codebooks, where $N>1$ is an integer that represents the number of antenna ports per polarization in the antenna array 160. In this respect there are L extension codebooks and the codebook for the N antenna ports (which may be seen as an extension codebook extended 0 times). Hence, $L+1=\log_2 N+1$ is the number of available levels, one per available HPBW. The codebooks can thus, as for the current LTE codebooks, be designed for dual-polarized antenna arrays 160, meaning that the total number of antenna ports is 2N.

Each extension codebook can be generated by iteratively extending the initial codebook until the extension codebook corresponds in size to N antenna ports per polarization. In more detail, according to an embodiment, each extension codebook comprises precoder vectors, where the precoder vectors are indexed as $W(l)=\{W(l,1), \ldots, W(l, K_l)\}$, where $l \in \{0, 1, \ldots, L\}$ represents extension codebook l, and where $K_l$ is the number of precoder vectors in extension codebook l. Each such per-level sub-codebook offers a radiation pattern with a certain HPBW chosen from the set of available HPBWs. Then, for $k \in \{0, 1, \ldots, K_l\}$ the extension codebook l is given by $$W(l, k) = \begin{bmatrix} X_A(l, k) & 0_N \\ 0_N & X_B(l, k) \end{bmatrix}$$

where $$X_A^{(i+1)}(l, k) = \begin{bmatrix} X_A^{(i)}(l, k) \\ -E_{n_t}[X_B^{(i)}(l, k)]^* \end{bmatrix} \text{ and }$$

$$X_B^{(i+1)}(l, k) = \begin{bmatrix} X_B^{(i)}(l, k) \\ -E_{n_t}[X_A^{(i)}(l, k)]^* \end{bmatrix} \text{ for } t = 1, \ldots, l.$$

Alternatively, $$W(l, k) = \begin{bmatrix} X_A^{1(t)}(l, k) & X_A^{2(t)}(l, k) \\ X_B^{1(t)}(l, k) & X_B^{2(t)}(l, k) \end{bmatrix}$$

where $$X_A^{1(t+1)}(l, k) = \begin{bmatrix} X_A^{1(t)}(l, k) \\ -E_{n_t} X_B^{1(t)*}(l, k) \end{bmatrix},$$

$$X_B^{1(t+1)}(l, k) = \begin{bmatrix} X_B^{1(t)}(l, k) \\ E_{n_t} X_A^{1(t)*}(l, k) \end{bmatrix},$$

$$X_A^{2(t+1)}(l, k) = \begin{bmatrix} X_A^{2(t)}(l, k) \\ -E_{n_t} X_B^{2(t)*}(l, k) \end{bmatrix},$$

-continued $$X_B^{2(t+1)}(l, k) = \begin{bmatrix} X_B^{2(t)}(l, k) \\ E_{n_t} X_A^{2(t)*}(l, k) \end{bmatrix} \text{ for } t = 1, \ldots, l.$$

This may preserve the beam pattern. Further alternatively, $$W(l, k) = \begin{bmatrix} X_A^{1(t)}(l, k) & X_A^{2(t)}(l, k) \\ X_B^{1(t)}(l, k) & X_B^{2(t)}(l, k) \end{bmatrix}$$

where $$X_A^{1(t+1)}(l, k) = \begin{bmatrix} X_A^{1(t)}(l, k) - E_{n_t}[X_B^{1(t)}(l, k)]^* \\ 0_{n_t} \end{bmatrix},$$

$$X_B^{1(t+1)}(l, k) = \begin{bmatrix} X_B^{1(t)}(l, k) + E_{n_t}[X_A^{1(t)}(l, k)]^* \\ 0_{n_t} \end{bmatrix},$$

$$X_A^{2(t+1)}(l, k) = \begin{bmatrix} X_A^{2(t)}(l, k) - E_{n_t}[X_B^{2(t)}(l, k)]^* \\ 0_{n_t} \end{bmatrix},$$

$$X_B^{2(t+1)}(l, k) = \begin{bmatrix} X_B^{2(t)}(l, k) + E_{n_t}[X_A^{2(t)*}(l, k)]^* \\ 0_{n_t} \end{bmatrix}.$$

This may preserve the beam pattern and may additionally produce two orthogonal ports.

In the above equations, $E_{n_t}$ denotes the square exchange matrix of size $n_t = 2^{t-1}$ given as:

$$E_{n_t} = \begin{bmatrix} 0 & \Lambda & 0 & 1 \\ M & N & N & 0 \\ 0 & 1 & N & M \\ 1 & 0 & \Lambda & 0 \end{bmatrix}.$$

In terms of the initial codebooks, the respective initial codebooks can be designed for $N/2^l$ antenna ports per polarization in the antenna array 160.

Further, according to an embodiment the respective initial codebooks comprise a collection of vectors from which at least one vector that spans an angle range to be covered by the signals to be transmitted to the wireless device 180 from the antenna array 160 is selectable. Each element of the vectors can have unit modulus.

In terms of selecting the respective initial codebooks, each respective initial codebook can comprise Discrete Fourier Transform, DFT, based precoders. For instance, each polarization-part of the precoders can initially be set to a length $$\frac{N}{2^l}$$

vector from a codebook for $$\frac{N}{2^l}$$

antenna ports per polarization. In an embodiment, a plain DFT-codebook may be used, where:

$$X_A^{(0)}(l, k) = X_B^{(0)}(l, k)$$
$$= \left[ 1, \exp\left(j2\pi k \frac{1}{n_l Q_l}\right), \ldots, \exp\left(j2\pi k \frac{n_l - 1}{n_l Q_l}\right) \right]^T,$$

where $n_l = N/2^l$ and $Q_l$ is the oversampling factor at level l in the codebook.

Each codebook W in the set of codebooks can be a combination of a wideband precoder $W_1$ and a frequency-selective precoder $W_2$ such that $W = W_1 W_2$, where $W_1 W_2$ denotes matrix multiplication between $W_1$ and $W_2$. The wideband precoder $W_1$ represents a precoder vector from one of the extension codebooks. Hence, for a pair of mutually orthogonal polarizations A and B, the k-th matrix from the level-l sub-codebook is given by $$W(l, k) = W_1(l, k) W_2 \qquad \text{Equation 5}$$
$$= \begin{bmatrix} X_A(l, k) & 0_N \\ 0_N & X_B(l, k) \end{bmatrix} \begin{bmatrix} 1 \\ e^{j\omega_p} \end{bmatrix},$$

$$W(l, k) = W_1(l, k) W_2 \qquad \text{Equation 6}$$
$$= \begin{bmatrix} X_A^1(l, k) & X_A^2(l, k) \\ X_B^1(l, k) & X_B^2(l, k) \end{bmatrix} \begin{bmatrix} 1 \\ e^{j\omega} \end{bmatrix}, \text{ or }$$

$$W(l, k) = W_1(l, k) W_2 \qquad \text{Equation 7}$$
$$= \begin{bmatrix} X_A^1(l, k) & 0 \\ 0 & X_B^2(l, k) \end{bmatrix} \begin{bmatrix} 1 \\ e^{j\omega} \end{bmatrix},$$

where $X_A^{1(0)}(l, k)$ and $X_B^{1(0)}(l, k)$ are DFT vectors given above. Precoder vectors $X_A(l,k)$ and $X_B(l,k)$ as well as $X_A^1(l, k)$, $X_A^2(l, k)$, $X_B^1(l, k)$, $X_B^2(l, k)$ guarantee to preserve the pattern of the initial DFT beam given by $X_A^{(0)}(l, k)$ and $X_B^{(0)}(l, k)$) applied to a subarray of the desired (smaller) size. Hence, in this way it is possible to construct beams with HPBWs corresponding to all possible subarrays (semi-arrays).

Figure 8:
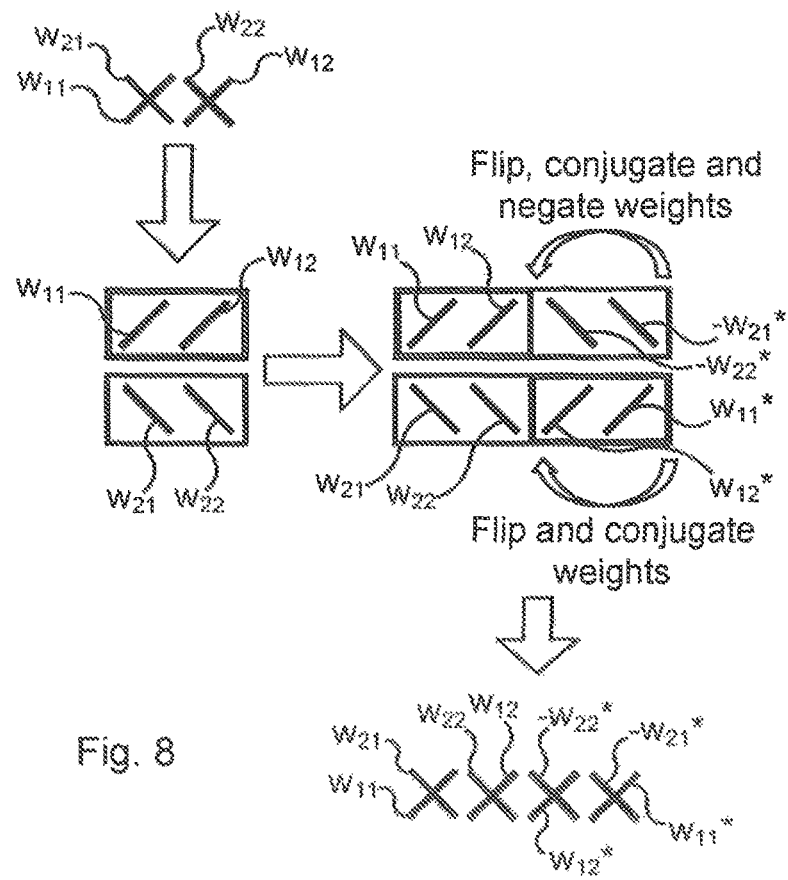
FIG. 8 is a schematic illustration of a procedure for extending a codebook according to embodiments.

An illustration of the above procedure for extending a codebook is presented in FIG. 8. Individual antenna weights are denoted by w with an appropriate index. For an array with N=8 dual-polarized antennas (depicted by an X in FIG. 8, where the style of lines (solid or hollow) is used to distinguish between the polarizations), L=4 layers can be obtained by reducing the number of utilized antennas to $n_l$ out of N. At the lowest level, the obtained radiation pattern will be the lowest-resolution (wide), corresponding to a single-element radiation pattern. With increasing the level index l, the resulting radiation pattern will get narrower, and the highest-resolution (narrow) beam is obtained when l=L=4, and hence $n_l$=N=8. An illustration of an intermediate step of the array expansion procedure in Equation 6 is depicted in FIG. 8. Namely, a given level-2 subarray with $n_2$=2 antenna elements is expanded to a new level-3 subarray with $n_3$=4. This is achieved by exciting the (so far) unused antenna elements with a modified set of weights of the given subarray (level-2 in this example). The antenna weights of the newly activated part of the new subarray (level-3 in this example) corresponding to polarization state A (in the sense: a given direction, or the transverse direction) are obtained by flipping, conjugating and negating the vector of weights corresponding to polarization state B of the given subarray (level-2 in this example). The antenna weights of the newly activated part of the new subarray (level-3 in this example) corresponding to polarization state B are obtained by flipping and conjugating the vector of weights corresponding to polarization state A of the given subarray (level-2 in this example). The radiation patterns of both subarrays are (level-2 and level-3) are exactly the same in spite of the different numbers of active antennas in their disposal. Therefore, by iteratively applying the same principle several times (until all the N antennas are activated for the entire array), the same radiation pattern can be achieved for the entire antenna array 150 as for the given subarray (level-2 in this example). Moreover, by selecting a subarray/level by which to initialize the above procedure, the HPBW that will be produced for the entire N-antenna array 160 can be selected.

Reference is now made to FIG. 5*a* illustrating a method for enabling beamforming using an antenna array 160 as performed by the wireless device 180 according to an embodiment.

For illustrative purposes, it can be assumed that the network node 180, by means of the radio access network node 120, transmits reference signals from the antenna array 160. The wireless device 180 then performs measurements on reference signals as in step S202:

S202: The wireless device 180 obtains channel measurements on reference signals received from the antenna array 160 to form channel estimates. The channel measurements can be performed by the wireless device 180 itself or be obtained from another wireless device 180.

These channel estimates are by the wireless device 180 used to select a precoding matrix indicator. Hence, the wireless device 180 is configured to perform step S204:

S204: The wireless device 180 selects, using the channel estimates, a precoding matrix indicator from a set of codebooks. As above, the set of codebooks comprises codebooks defining variable beam widths and having same number of non-zero antenna weights for each beam width.

The selected indicator is then communicated to the network node 150 by the wireless device 180, as in step S206:

S206: The wireless device 180 transmits the precoding matrix indicator to the network node 150.

Embodiments relating to how the network node 150 uses the precoding matrix indicator to select a codebook have been disclosed above with reference to FIG. 4. For illustrative purposes, it can be assumed that the network node 150 precodes transmission of signals to the wireless device 180 from the antenna array 160 using the selected codebook. This transmission of signals is thus assumed to be received by the wireless device 180 as in step S208:

S208: The wireless device 180 receives transmission of signals from the antenna array 160. The transmission signals have been precoded with the selected codebook. The selected codebook defines the precoding matrix.

Embodiments relating to further details of enabling beamforming using an antenna array 160 will now be disclosed.

In principle, embodiments relating to the set of codebooks as disclosed with reference to the network node 150 also apply to the wireless device 180 and hence for brevity these embodiments are not repeated here.

Reference is now made to FIG. 5*b* illustrating methods for enabling beamforming using an antenna array 160 as performed by the wireless device 180 according to further embodiments. It is assumed that steps S202-S208 are performed as disclosed above with reference to FIG. 5*a*.

There may be different ways for the wireless device 180 to select the precoding matrix indicator. According to an embodiment each codebook in the set of codebooks corresponds to a beam width. The wireless device 180 can then be configured to select the precoding matrix indicator by sequentially searching the set of codebooks as in step S204*a*:

S204*a*: The wireless device 180 sequentially searches the set of codebooks for that codebook in the set of codebooks that maximizes received power of the channel estimates. The wireless device 180 starts at that codebook in the set of codebooks that corresponds to the broadest beam width.

Step S204*a* may be performed as part of above disclosed step S204.

In this respect it is only required by the wireless device 180 to form only one channel estimate H. The wireless device 180 then searches a codebook level 1 (which is defined by a set of precoders $\{W(l,1), \ldots, W(l, K_l)\}$) e.g. by calculating the received power of each precoder i in the codebook as $\|H \cdot W(l, i)\|^2$.

There may be different ways for the wireless device 180 to determine for how long to sequentially search the set of codebooks. In a basic codebook search, the wireless device 180 may search through all precoders in the codebook (for all codebook levels) and calculate an estimate of the throughput (which is a function of the SINR which is a function of the received power) for each precoder hypothesis. The precoder resulting in the largest throughput will then be selected. However, according to an embodiment the set of codebooks is sequentially searched only until a gain in at least one of throughput and power between two codebooks in the set of codebooks having adjacent beam widths is smaller than a threshold value. For each level l, the wireless device 180 would then select the best precoder and have calculated a corresponding throughput estimate $\gamma_l$. In order to decide if the wireless device 180 is to continue searching the next codebook level (l+1) (corresponding to a more narrow beam), the wireless device 180 can compare the throughput estimate at level l−1 with that for level l. If the gain in throughput of increasing the codebook level does not exceed some threshold δ, the wireless device 180 stays at level l−1. I.e., here the criterion for searching the next codebook level is $\gamma_l - \gamma_{l-1} > \delta$. Alternatively, the criterion for searching the next codebook level could be based on received power instead, i.e., the wireless device 180 searches the next codebook level if $P_l - P_{l-1} > \delta$.

When moving up a codebook level the maximum antenna gain by is increased by 3 dB and hence the received power will increase with 3 dB if the channel is Line-of-Sight, but less or nothing at all if there is angular spread in the channel. Therefore, according to an embodiment the value of δ is 0.5-1 dB. Further, the value of δ could either be pre-defined, signaled to the wireless device 180 by the network node 150 or it may depend on for instance the noise level at the wireless device 180. If the wireless device 180 has a large noise level the wireless device 180 may increase the value of δ to favor a broader beam over a more narrow beam. The value of δ may be different for each codebook level. For instance, the value of δ may be set to increase with increasing codebook level, e.g. linearly with a constant k: $\delta_l = k \cdot l$. Hence, the threshold value can be the same or unique for each codebook in the set of codebooks.

The embodiments disclosed herein further relate to mechanisms for signaling a precoding matrix indicator of an antenna array 160. In order to obtain such mechanisms there is provided a network node 150, a method performed by the network node 150, a computer program product comprising code, for example in the form of a computer program, that when run on processing circuitry of the network node 150, causes the network node 150 to perform the method. In order to obtain such mechanisms there is further provided a wireless device 180, a method performed by the wireless device 180, and a computer program product comprising code, for example in the form of a computer program, that when run on processing circuitry of the wireless device 180, causes the wireless device 180 to perform the method.

Figure 6:
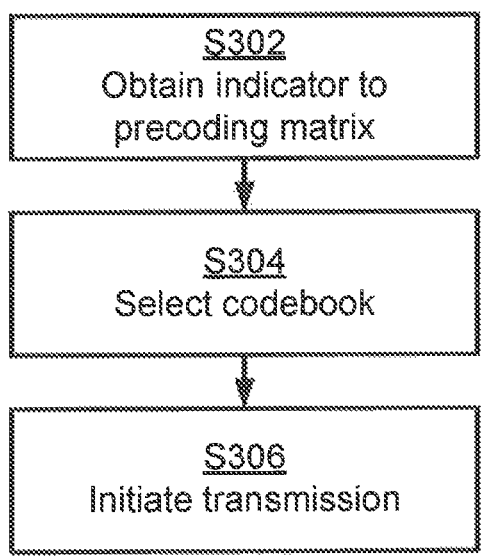
Figure 7:
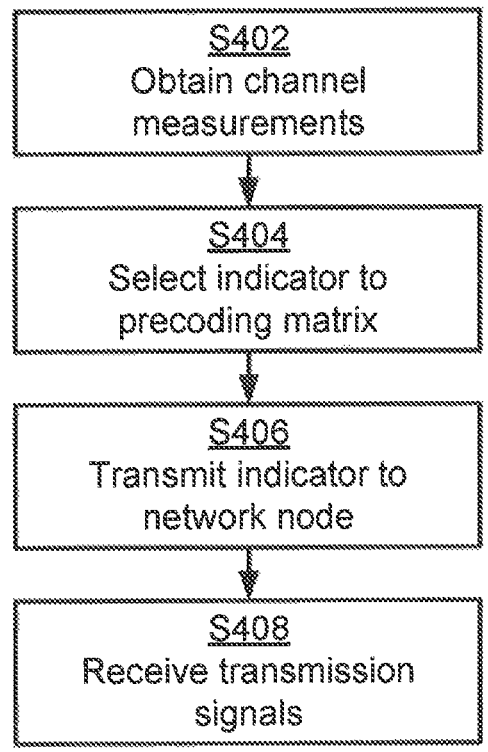

FIG. 6 is a flow chart illustrating embodiments of a method for signaling a precoding matrix indicator of an antenna array 160 as performed by the network node 150. FIG. 7 is a flow chart illustrating embodiments of a method for signaling a precoding matrix indicator of an antenna array 160 as performed by the wireless device 180. The methods are advantageously provided as computer programs 1120*c*, 1120*d*.

Reference is now made to FIG. 6 illustrating a method for signaling a precoding matrix indicator of an antenna array 160 as performed by the network node 150 according to an embodiment.

For illustrative purposes, it can be assumed that the wireless device 180 has performed channel measurements on reference signals as transmitted by the antenna array 160 of the radio access network node 120 in order for the wireless device 180 to form channel estimates and that the wireless device 180 has selected a precoding matrix indicator using the channel estimates. The network node 150 is therefore configured to obtain the precoding matrix indicator as in step S302:

S302: The network node 150 obtains, from the wireless device 180, a precoding matrix indicator of a precoding matrix. The precoding matrix is to be used for transmission from the network node 150 (by means of the radio access network node 120) to the wireless device 180. The precoding matrix indicator independently defines a direction parameter and a beam width parameter of the precoding matrix.

In this respect, the precoding matrix indicator allows direction and beam width to be signaled independently of one another. This may apply with the exception of the codebook on the simplest level (i.e., the codebook corresponding to a single broad beam), which may have only one direction. The network node 150 then selects a codebook based on the received indicator. Hence, the network node 150 is configured to perform step S304:

S304: The network node 150 selects a codebook from a set of codebooks according to the received indicator.

Once the codebook has been selected the network node 150 can use it for precoding. Hence, the network node 150 is configured to perform step S306:

S306: The network node 150 precodes transmission of signals to the wireless device 180 from the antenna array 150 using the selected codebook.

Reference is now made to FIG. 7 illustrating a method for signaling a precoding matrix indicator of an antenna array 160 as performed by the wireless device 180 according to an embodiment.

For illustrative purposes, it can be assumed that the network node 180, by means of the radio access network node 120, transmits reference signals from the antenna array 160. The wireless device 180 then performs measurements on reference signals as in step S402:

S402: The wireless device 180 performs channel measurements on reference signals received from the antenna array 160 to form channel estimates.

These channel estimates are by the wireless device 180 used to select a precoding matrix indicator. Hence, the wireless device 180 is configured to perform step S404:

S404: The wireless device 180 selects, using the channel estimates, a precoding matrix indicator to be used for transmission to the wireless device. As disclosed above, the precoding matrix indicator independently defines a direction parameter and a beam width parameter of the precoding matrix.

The selected indicator is then communicated to the network node 150 by the wireless device 180, as in step S406:

S406: The wireless device 180 transmits the precoding matrix indicator to the network node 150.

For illustrative purposes, it can be assumed that the network node 150 precodes transmission of signals to the wireless device 180 from the antenna array 160 using a selected codebook. This transmission of signals is thus assumed to be received by the wireless device 180 as in step S408:

S408: The wireless device 180 receives transmission of signals from the antenna array 160. The transmission signals have been precoded with the selected codebook. The selected codebook has (by the network node 150) been selected according to the precoding matrix indicator.

Hence, with reference to the above embodiments for beamforming using an antenna array 160 and for enabling beamforming using an antenna array 160 the wireless device 180 can select two indices $l \in \{0, \ldots, L\}$ and $k \in \{1, \ldots, K\}$ that will characterize the resulting beam (in terms of HPBW and spatial direction, respectively) that is to be used for the transmission of signals. Equivalently, the wireless device 180 may select a joint index being an invertible function of the two indices k, l. Examples include $\alpha k+1$ with $|\alpha| \geq L+1$ and $k+\beta l$ with $|\beta| \geq K$.

Figure 9A:
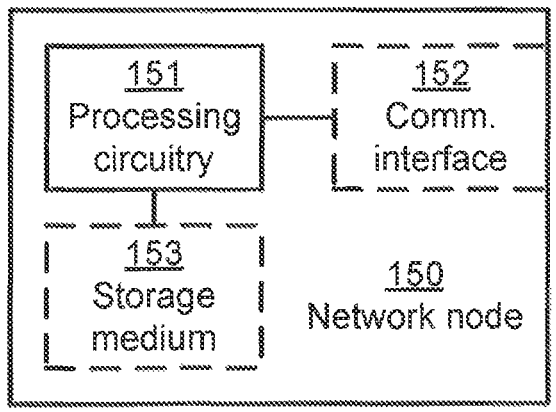
FIG. 9a is a schematic diagram showing functional units of a network node according to an embodiment.

FIG. 9*a* schematically illustrates, in terms of a number of functional units, the components of a network node 150 according to an embodiment. Processing circuitry 151 is provided using any combination of one or more of a suitable central processing unit (CPU), multiprocessor, microcontroller, digital signal processor (DSP), etc., capable of executing software instructions stored in a computer program product 1110*a* (as in FIG. 11), e.g. in the form of a storage medium 153. The processing circuitry 151 may further be provided as at least one application specific integrated circuit (ASIC), or field programmable gate array (FPGA).

Particularly, the processing circuitry 151 is configured to cause the network node 150 to perform a set of operations, or steps, S102-S106, S302-S306, as disclosed above. For example, the storage medium 153 may store the set of operations, and the processing circuitry 151 may be configured to retrieve the set of operations from the storage medium 153 to cause the network node 150 to perform the set of operations. The set of operations may be provided as a set of executable instructions. Thus the processing circuitry 151 is thereby arranged to execute methods as herein disclosed.

The storage medium 153 may also comprise persistent storage, which, for example, can be any single one or combination of magnetic memory, optical memory, solid state memory or even remotely mounted memory.

The network node 150 may further comprise a communications interface 152 for communications at least with a wireless device 150, for example via a radio access network node 120. As such the communications interface 152 may comprise one or more transmitters and receivers, comprising analogue and digital components and a suitable number of antennas for wireless communications and ports for wireline communications.

The processing circuitry 151 controls the general operation of the network node 150 e.g. by sending data and control signals to the communications interface 152 and the storage medium 153, by receiving data and reports from the communications interface 152, and by retrieving data and instructions from the storage medium 153. Other components, as well as the related functionality, of the network node 150 are omitted in order not to obscure the concepts presented herein.

Figure 9B:
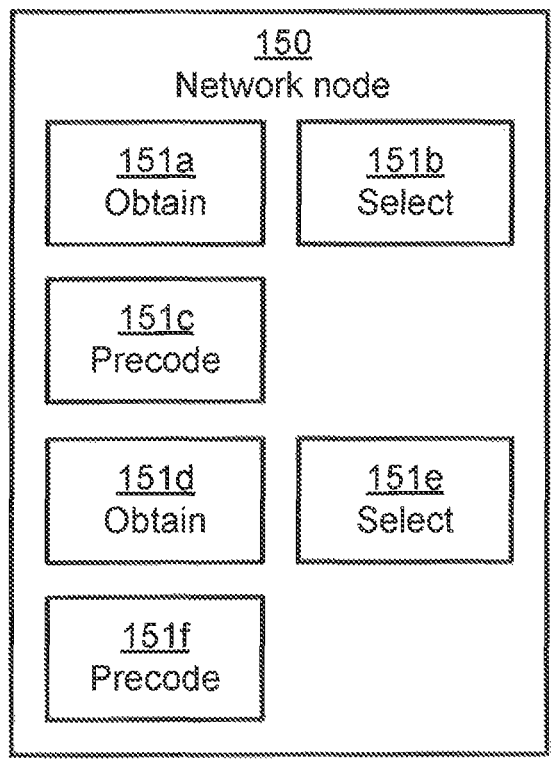
FIG. 9b is a schematic diagram showing functional modules of a network node according to an embodiment.

FIG. 9b schematically illustrates, in terms of a number of functional modules, the components of a network node 150 according to an embodiment. The network node 150 of FIG. 9b comprises a number of functional modules. According to an embodiment the network node 150 comprises at least an obtain module 151a configured to perform step S102, a select module 151b configured to perform step S104, and a precode module 151c configured to perform step S106. According to an embodiment the network node 150 comprises at least an obtain module 151d configured to perform step S302, a select module 151e configured to perform step S304, and a precode module 151f configured to perform step S306.

In general terms, each functional module 151a-151f may be implemented in hardware or in software. Preferably, one or more or all functional modules 151a-151f may be implemented by the processing circuitry 151, possibly in cooperation with functional units 220 and/or 230. The processing circuitry 151 may thus be arranged to from the storage medium 153 fetch instructions as provided by a functional module 151a-151f and to execute these instructions, thereby performing any steps as will be disclosed hereinafter.

The network node 150 may be provided as a standalone device or as a part of at least one further device. For example, the network node 150 may be provided in a node of the radio access network 110 or in a node of the core network 130. Alternatively, functionality of the network node 150 may be distributed between at least two devices, or nodes. These at least two nodes, or devices, may either be part of the same network part (such as the radio access network 110 or the core network 130) or may be spread between at least two such network parts. In general terms, instructions that are required to be performed in real time may be performed in a device, or node, operatively closer to the radio access network 110 than instructions that are not required to be performed in real time. In this respect, at least part of the network node 150 may reside in the radio access network 110, such as co-located with the radio access network node 120, for cases when embodiments as disclosed herein are performed in real time.

Thus, a first portion of the instructions performed by the network node 150 may be executed in a first device, and a second portion of the of the instructions performed by the network node 150 may be executed in a second device; the herein disclosed embodiments are not limited to any particular number of devices on which the instructions performed by the network node 150 may be executed. Hence, the methods according to the herein disclosed embodiments are suitable to be performed by a network node 150 residing in a cloud computational environment. Therefore, although a single processing circuitry 151 as illustrated in FIG. 9a and the processing circuitry 151 may be distributed among a plurality of devices, or nodes. The same applies to the functional modules 151a-151f of FIG. 9b and the computer program 1120a, 1120c of FIG. 11 (see below).

Figure 10B:
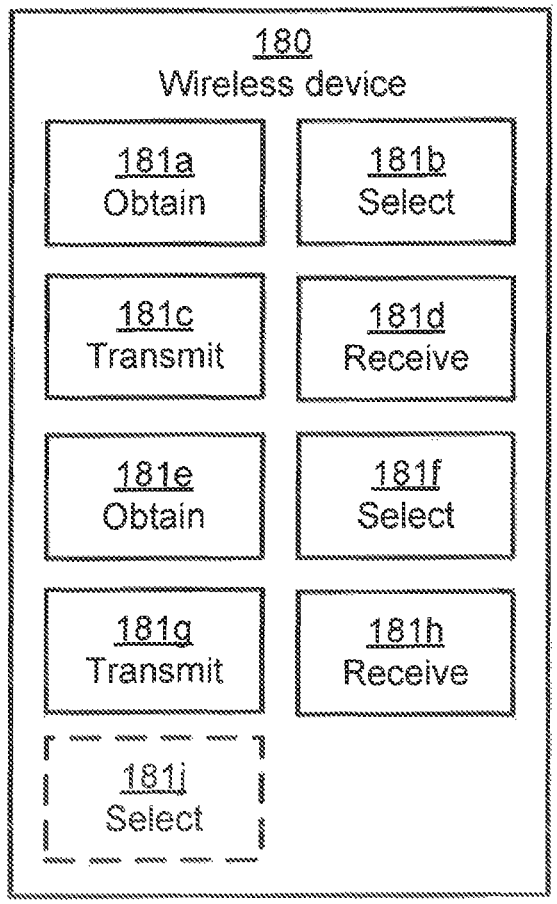
FIG. 10b is a schematic diagram showing functional modules of a wireless device according to an embodiment.
Figure 10A:
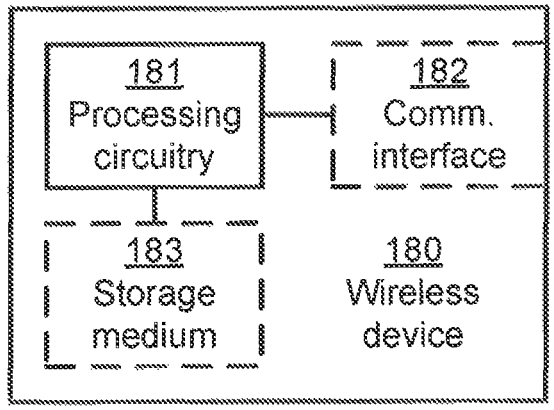
FIG. 10a is a schematic diagram showing functional units of a wireless device according to an embodiment.

FIG. 10a schematically illustrates, in terms of a number of functional units, the components of a wireless device 180 according to an embodiment. Processing circuitry 181 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 183. The processing circuitry 181 may further be provided as at least one application specific integrated circuit (ASIC), or field programmable gate array (FPGA).

Particularly, the processing circuitry 181 is configured to cause the wireless device 180 to perform a set of operations, or steps, S202-S208, S402-S408, as disclosed above. For example, the storage medium 183 may store the set of operations, and the processing circuitry 181 may be configured to retrieve the set of operations from the storage medium 183 to cause the wireless device 180 to perform the set of operations. The set of operations may be provided as a set of executable instructions. Thus the processing circuitry 181 is thereby arranged to execute methods as herein disclosed.

The storage medium 183 may also comprise persistent storage, which, for example, can be any single one or combination of magnetic memory, optical memory, solid state memory or even remotely mounted memory.

The wireless device 180 may further comprise a communications interface 182 for communications at least with a network node 150, for example via a radio access network node 120. As such the communications interface 182 may comprise one or more transmitters and receivers, comprising analogue and digital components and a suitable number of antennas for wireless communications and ports for wireline communications.

The processing circuitry 181 controls the general operation of the wireless device 180 e.g. by sending data and control signals to the communications interface 182 and the storage medium 183, by receiving data and reports from the communications interface 182, and by retrieving data and instructions from the storage medium 183. Other components, as well as the related functionality, of the wireless device 180 are omitted in order not to obscure the concepts presented herein.

FIG. 10b schematically illustrates, in terms of a number of functional modules, the components of a wireless device 180 according to an embodiment. According to an embodiment the wireless device 180 comprises at least an obtain module 181a configured to perform step S202, a select module 181b configured to perform step S204, a transmit module 181c configured to perform step S206, and a receive module 181d configured to perform step S208. According to this embodiment the wireless device 180 optionally further comprises a search module 181j configured to perform step 204a. According to an embodiment the wireless device 180 comprises at least an obtain module 181e configured to perform step S402, a select module 181f configured to perform step S404, a transmit module 181g configured to perform step S406, and a receive module 181g configured to perform step S408.

In general terms, each functional module 181a-181j may be implemented in hardware or in software. Preferably, one or more or all functional modules 181a-181j may be implemented by the processing circuitry 181, possibly in cooperation with functional units 320 and/or 330. The processing circuitry 181 may thus be arranged to from the storage medium 183 fetch instructions as provided by a functional module 181a-181j and to execute these instructions, thereby performing any steps as will be disclosed hereinafter.

Figure 11:
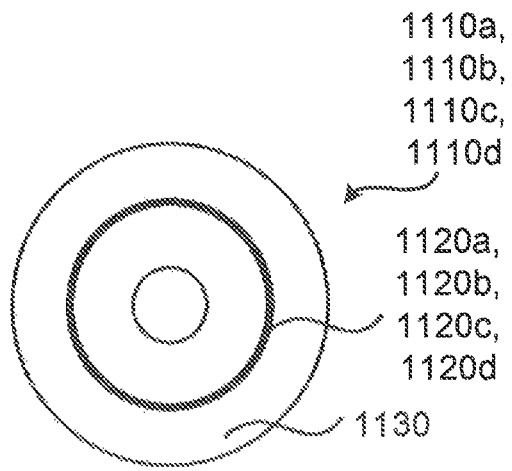
FIG. 11 shows one example of a computer program product comprising computer readable means according to an embodiment.

FIG. 11 shows one example of a computer program product 1110a, 1110b, 1110c, 1110d comprising computer readable means 1130. On this computer readable means 1130, a computer program 1120a can be stored, which computer program 1120a can cause the processing circuitry 151 and thereto operatively coupled entities and devices, such as the communications interface 152 and the storage medium 153, to execute methods according to steps S102-S106 as described herein. On this computer readable means 1130, a computer program 1120b can be stored, which computer program 1120b can cause the processing circuitry 181 and thereto operatively coupled entities and devices, such as the communications interface 182 and the storage medium 183, to execute methods according to steps S202-S208 as described herein. On this computer readable means 1130, a computer program 1120c can be stored, which computer program 1120c can cause the processing circuitry 151 and thereto operatively coupled entities and devices, such as the communications interface 152 and the storage medium 153, to execute methods according to steps S302-S106 as described herein. On this computer readable means 1130, a computer program 1120d can be stored, which computer program 1120d can cause the processing circuitry 181 and thereto operatively coupled entities and devices, such as the communications interface 182 and the storage medium 183, to execute methods according to steps S402-S408 as described herein.

In the example of FIG. 11, the computer program product 1110a, 1110b, 1110c, 1110d is illustrated as an optical disc, such as a CD (compact disc) or a DVD (digital versatile disc) or a Blu-Ray disc. The computer program product 1110a, 1110b, 1110c, 1110d could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer programs 1120a, 1120b, 1120c, 1120d are here schematically shown as a track on the depicted optical disk, the computer programs 1120a, 1120b, 1120c, 1120d can be stored in any way which is suitable for the computer program product 1110a, 1110b, 1110c, 1110d.

In summary, embodiments disclosed herein enable improvements of the transmission adaptability to channel conditions by using a multi-level codebook capable of providing various beam widths for the radiation pattern at the antenna array 160 of the radio access network node. The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for signaling a precoding matrix indicator of an antenna array, the method being performed by a network node and comprising:
   obtaining, from a wireless device, a precoding matrix indicator to be used for transmission to the wireless device, wherein the precoding matrix indicator independently defines a direction parameter and a beam width parameter of the precoding matrix;
   selecting a codebook from a set of codebooks according to the received indicator, wherein selecting the codebook comprises:
      determining a subset of the set of codebooks based on the direction parameter; and
      selecting from the subset a codebook corresponding to the beam width indicated in the beam width parameter;
   precoding transmission of signals to the wireless device from the antenna array using said selected codebook; and
   transmitting the signals to the wireless device using the antenna array after precoding the transmission of signals using the selected codebook.

2. A method for signaling a precoding matrix indicator of an antenna array, the method being performed by a wireless device and comprising:
   obtaining channel measurements on reference signals received from the antenna array to form channel estimates;
   selecting, using the channel estimates, a precoding matrix indicator to be used for transmission to the wireless device, wherein the precoding matrix indicator independently defines a direction parameter and a beam width parameter of the precoding matrix;
   transmitting the precoding matrix indicator to a network node; and
   receiving transmission of signals from the network node via the antenna array, the transmission signals having been precoded with a selected codebook, the selected codebook being selected according to the precoding matrix indicator, wherein the selected codebook is selected by determining a subset of the set of codebooks based on the direction parameter and selecting from the subset a codebook corresponding to the beam width indicated in the beam width parameter.

3. A network node for signaling a precoding matrix indicator of an antenna array, the network node comprising:
   processing circuitry; and
   a storage medium storing instructions that, when executed by the processing circuitry, causes the network node to:
      obtain, from a wireless device, a precoding matrix indicator to be used for transmission to the wireless device, wherein the precoding matrix indicator independently defines a direction parameter and a beam width parameter of the precoding matrix;
      select a codebook from a set of codebooks according to the received indicator, wherein selecting the codebook comprises:
         determining a subset of the set of codebooks based on the direction parameter; and
         selecting from the subset a codebook corresponding to the beam width indicated in the beam width parameter;
      precode transmission of signals to the wireless device from the antenna array using said selected codebook; and
      transmit the signals to the wireless device using the antenna array after precoding the transmission of signals using the selected codebook.

4. A wireless device for signaling a precoding matrix indicator of an antenna array, the wireless device comprising:
   processing circuitry; and
   a storage medium storing instructions that, when executed by the processing circuitry, causes the wireless device to:
      perform channel measurements on reference signals received from the antenna array to form channel estimates;
      select, using the channel estimates, a precoding matrix indicator to be used for transmission to the wireless device, wherein the precoding matrix indicator independently defines a direction parameter and a beam width parameter of the precoding matrix;

transmit the precoding matrix indicator to a network node; and receive transmission of signals from the network node via the antenna array, the transmission signals having been precoded with a selected codebook, the selected codebook being selected according to the precoding matrix indicator, wherein the selected codebook is selected by determining a subset of the set of codebooks based on the direction parameter and selecting from the subset a codebook corresponding to the beam width indicated in the beam width parameter.

5. A non-transitory computer readable medium storing a computer program for signaling a precoding matrix indicator of an antenna array, the computer program comprising computer code which, when run on processing circuitry of a network node, causes the network node to:

obtain, from a wireless device, a precoding matrix indicator to be used for transmission to the wireless device, wherein the precoding matrix indicator independently defines a direction parameter and a beam width parameter of the precoding matrix;

select a codebook from a set of codebooks according to the received indicator, wherein selecting the codebook comprises:

determining a subset of the set of codebooks based on the direction parameter; and selecting from the subset a codebook corresponding to the beam width indicated in the beam width parameter;

precode transmission of signals to the wireless device from the antenna array using said selected codebook; and transmit the signals to the wireless device using the antenna array after precoding the transmission of signals using the selected codebook.

6. A non-transitory computer readable medium storing a computer program for signaling a precoding matrix indicator of an antenna array, the computer program comprising computer code which, when run on processing circuitry of a wireless device, causes the wireless device to:

obtain channel measurements on reference signals received from the antenna array to form channel estimates;

select, using the channel estimates, a precoding matrix indicator to be used for transmission to the wireless device, wherein the precoding matrix indicator independently defines a direction parameter and a beam width parameter of the precoding matrix;

transmit the precoding matrix indicator to a network node; and receive transmission of signals from the network node via the antenna array, the transmission signals having been precoded with a selected codebook, the selected codebook being selected according to the precoding matrix indicator, wherein the selected codebook is selected by determining a subset of the set of codebooks based on the direction parameter and selecting from the subset a codebook corresponding to the beam width indicated in the beam width parameter.

* * * * *

UNITED STATES PATENT AND TRADEMARK OFFICE
CERTIFICATE OF CORRECTION

PATENT NO. : 10,541,735 B2  
APPLICATION NO. : 16/050520  
DATED : January 21, 2020  
INVENTOR(S) : Girnyk et al.

Page 1 of 3

It is certified that error appears in the above-identified patent and that said Letters Patent is hereby corrected as shown below:

In the Specification

In Column 1, Line 7, delete "2016," and insert -- 2016, now U.S. Pat. No. 10,164,694, --, therefor.

In Column 3, Lines 41-42, delete "steps, operations," and insert -- steps. The operations, --, therefor.

In Column 5, Line 11, delete "devices, if" and insert -- devices. If --, therefor.

In Column 6, Line 21, delete "receiving to" and insert -- receiving --, therefor.

In Column 8, Line 28, delete "composes" and insert -- comprises --, therefor.

In Column 10, Lines 12-13, delete " $X^k = \begin{bmatrix} 1 & e^{j2\pi \frac{k}{NQl}} & \dots & e^{j2n\frac{(N-1)k}{NQ}} \end{bmatrix}^T,$ " and insert -- $X^k = \begin{bmatrix} 1 & e^{j2\pi \frac{k}{NQl}} & \dots & e^{j2\pi \frac{(N-1)k}{NQ}} \end{bmatrix}^T,$ --, therefor.

In Column 9, Lines 25-27, delete " $\omega = \frac{z\pi p}{P}$ " and insert -- $\omega = \frac{2\pi p}{P},$ --, therefor.

In Column 11, Line 2, delete "number or antennas" and insert -- number of antennas --, therefor.

In Column 11, Line 7, delete "a ϕ=ϕ₀." and insert -- at ϕ=ϕ₀. --, therefor.

In Column 11, Line 10, delete "at" and insert -- at a --, therefor.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,541,735 B2

In Column 11, Line 20, delete "In such as case," and insert -- In such a case, --, therefor.

In Column 11, Line 29, delete "angle $\hat{\phi}$," and insert -- angle $\bar{\phi}$, --, therefor.

In Column 11, Lines 34-35, delete "$AS_{RMS} = \sqrt{\dfrac{\sum_i p_i \cdot e^{j(\phi_i - \phi)}}{\sum_i p_i}}$" and insert -- $AS_{RMS} = \sqrt{\dfrac{\sum_i p_i \cdot e^{j(\phi_i - \bar{\phi})}}{\sum_i p_i}}$ --, therefor.

In Column 11, Line 54, delete "L+1=log$_2$ (8)+1=4" and insert -- L+1=log$_2$(8)+1=4 --, therefor.

In Column 14, Line 39, delete "I" and insert -- 1 --, therefor.

In Column 14, Lines 42-43, delete "$W(l,k) = \begin{bmatrix} X_A(l,k) & 0_N \\ 0_N & X_B(l,k) \end{bmatrix}$" and insert -- $\mathbf{W}(l,k) = \begin{bmatrix} \mathbf{X}_A^{(t)}(l,k) & \mathbf{0}_N \\ \mathbf{0}_N & \mathbf{X}_B^{(t)}(l,k) \end{bmatrix}$, --, therefor.

In Column 14, Lines 47-51, delete "$X_A^{(t+1)}(l,k) = \begin{bmatrix} X_A^{(t)}(l,k) \\ -E_{n_t}[X_B^{(t)}(l,k)]^* \end{bmatrix}$ and $X_B^{(t+1)}(l,k) = \begin{bmatrix} X_B^{(t)}(l,k) \\ -E_{n_t}[X_A^{(t)}(l,k)]^* \end{bmatrix}$ for $t = 1, \ldots, L$." and insert -- $\mathbf{X}_A^{(t+1)}(l,k) = \begin{bmatrix} \mathbf{X}_A^{(t)}(l,k) \\ -\mathbf{E}_{n_t}[\mathbf{X}_B^{(t)}(l,k)]^* \end{bmatrix}$ and $\mathbf{X}_B^{(t+1)}(l,k) = \begin{bmatrix} \mathbf{X}_B^{(t)}(l,k) \\ \mathbf{E}_{n_t}[\mathbf{X}_A^{(t)}(l,k)]^* \end{bmatrix}$ for $t = 1, \ldots, l$. --, therefor.

In Column 15, Lines 23-25, delete "$X_B^{2(t+1)}(l,k) = \begin{bmatrix} X_B^{2(t)}(l,k) + E_{n_t}[X_A^{2(t)*}(l,k)]^* \\ 0_{n_t} \end{bmatrix}$." and insert -- $\mathbf{X}_B^{2(t+1)}(l,k) = \begin{bmatrix} \mathbf{X}_B^{2(t)}(l,k) + \mathbf{E}_{n_t}[\mathbf{X}_A^{2(t)}(l,k)]^* \\ \mathbf{0}_{n_t} \end{bmatrix}$. --, therefor.

CERTIFICATE OF CORRECTION (continued)
U.S. Pat. No. 10,541,735 B2

In Column 15, Lines 33-36, delete "$E_{n_t} = \begin{bmatrix} 0 & \Lambda & 0 & 1 \\ M & N & N & 0 \\ 0 & 1 & N & M \\ 1 & 0 & \Lambda & 0 \end{bmatrix}$" and insert -- $\mathbf{E}_{n_t} = \begin{bmatrix} 0 & \cdots & 0 & 1 \\ \vdots & \ddots & \ddots & 0 \\ 0 & 1 & \ddots & \vdots \\ 1 & 0 & \cdots & 0 \end{bmatrix}$ --, therefor.

In Column 16, Line 33, delete "$X_B^{1(0)}(I, k)$" and insert -- $X_B^{1(0)}(l, k)$ --, therefor.

In Column 17, Line 9, delete "antenna array 150" and insert -- antenna array 160 --, therefor.

In Column 17, Line 20, delete "network node 180," and insert -- network node 150, --, therefor.

In Column 18, Line 13, delete "level 1" and insert -- level $l$ --, therefor.

In Column 18, Line 35, delete "I-1" and insert -- l-1 --, therefor.

In Column 19, Line 49, delete "antenna array 150" and insert -- antenna array 160 --, therefor.

In Column 19, Line 56, delete "network node 180," and insert -- network node 150, --, therefor.

In Column 20, Lines 28-29, delete "function of the two indices k, l. Examples include αk+l with |α|>L+l and k+β1 with |β| ≥ K." and insert -- function of the two indices $k, l$. Examples include $\alpha k + l$ with $|\alpha| \geq L + 1$ and $k + \beta l$ with $|\beta| \geq K$. --, therefor.

In Column 20, Line 59, delete "wireless device 150," and insert -- wireless device 180, --, therefor.

In Column 21, Line 49, delete "of the of the" and insert -- of the --, therefor.

In Column 21, Line 57, delete "single processing circuitry 151 as" and insert -- single processing circuitry 151 is --, therefor.

In Column 22, Line 53, delete "receive module 181g" and insert -- receive module 18h --, therefor.

In Column 23, Lines 16-17, delete "S302-S106" and insert -- S302-S306 --, therefor.